United States Patent
Ye et al.

(10) Patent No.: US 10,027,219 B1
(45) Date of Patent: Jul. 17, 2018

(54) SWITCHING CONTROLLER CIRCUIT

(71) Applicant: NXP USA, INC., Austin, TX (US)

(72) Inventors: Wanfu Ye, Shanghai (CN); Lingling Wang, Shanghai (CN)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 15/702,767

(22) Filed: Sep. 13, 2017

(30) Foreign Application Priority Data

Aug. 9, 2017 (CN) .......................... 2017 1 0673013

(51) Int. Cl.
*H02M 3/156* (2006.01)
*H02M 1/08* (2006.01)
*G05F 1/46* (2006.01)
*H02M 3/158* (2006.01)
*H02M 1/00* (2006.01)

(52) U.S. Cl.
CPC ................ *H02M 1/08* (2013.01); *G05F 1/46* (2013.01); *H02M 3/156* (2013.01); *H02M 3/158* (2013.01); *H02M 2001/0006* (2013.01); *H02M 2001/0025* (2013.01); *H02M 2001/0032* (2013.01)

(58) Field of Classification Search
CPC ....................................................... H02M 3/156
See application file for complete search history.

(56) References Cited

U.S. PATENT DOCUMENTS

| 6,307,356 | B1 | 10/2001 | Dwelley | |
| 6,496,390 | B2 | 12/2002 | Yang | |
| 8,957,661 | B2 | 2/2015 | Heo | |
| 9,337,736 | B2 | 5/2016 | Chung | |
| 9,401,637 | B2 | 7/2016 | Wei et al. | |
| 2010/0188061 | A1 | 7/2010 | Ma | |
| 2011/0267024 | A1 | 11/2011 | Halberstadt | |
| 2013/0003421 | A1 | 1/2013 | Fang | |
| 2013/0308791 | A1 | 11/2013 | Yang et al. | |
| 2014/0307478 | A1 | 10/2014 | Leisten | |
| 2015/0028830 | A1* | 1/2015 | Chen | H02M 3/158 323/271 |
| 2015/0042299 | A1* | 2/2015 | Li | H02M 1/36 323/271 |
| 2015/0091544 | A1* | 4/2015 | Jayaraj | H02M 3/156 323/284 |
| 2015/0229324 | A1* | 8/2015 | Soenen | H03H 17/00 341/143 |
| 2015/0338866 | A1* | 11/2015 | Hu | H02M 3/157 323/280 |
| 2016/0011610 | A1* | 1/2016 | Hayashi | H02M 3/1588 348/730 |

(Continued)

*Primary Examiner* — Nguyen Tran
*Assistant Examiner* — Trinh Q Dang
(74) *Attorney, Agent, or Firm* — Charles E. Bergere

(57) ABSTRACT

A switching controller circuit for a power converter includes analog and digital control circuits, a clock enable circuit, and a digital pulse width modulation (PWM) circuit. When the power converter is in a standby mode, the switching controller circuit operates in an analog control mode by activating the analog control circuit. When the power converter is not in standby mode, the switching controller circuit activates the digital control circuit and operates in a digital control mode. The switching controller circuit uses inexpensive electronic components and consumes less power in the analog control mode, thereby reducing standby mode power consumption.

20 Claims, 3 Drawing Sheets

(56) References Cited

U.S. PATENT DOCUMENTS

| | | |
|---|---|---|
| 2016/0099639 A1 | 4/2016 | Leisten |
| 2016/0336851 A1* | 11/2016 | Li ............................ H02M 1/32 |
| 2017/0070149 A1* | 3/2017 | Guan ..................... H02M 3/158 |
| 2017/0093281 A1* | 3/2017 | Kim ....................... H02M 3/158 |
| 2017/0187287 A1* | 6/2017 | Zuo ........................ H02M 3/158 |

* cited by examiner

SWITCHING CONTROLLER CIRCUIT

BACKGROUND

The present invention relates generally to power converters, and, more particularly, to a switching controller circuit for a switched-mode power converter.

Switched-mode power converters transform one form of electrical energy into another, such as an alternating current (AC) into a direct current (DC) and vice-versa. Examples of switched-mode power converters include rectifiers, voltage regulators, inverters, and frequency converters. Switched-mode power converters typically include a switching controller circuit and a power converter. The power converter includes a voltage source, switches connected to the voltage source, and passive components like inductors and capacitors. The power converter is connected to an electronic component, i.e., a load, to which power is delivered.

The switching controller circuit is connected to a feedback network and receives a supply voltage of the power converter from the feedback network. The switching controller circuit controls the switches that are connected to the voltage source by outputting pulse width modulated (PWM) signals. When a PWM signal is high (i.e., logic high), the switches are turned on, and when the PWM signal is low (i.e., logic low), the switches are turned off. The switches are switched alternately on and off to control the supply voltage to the power converter. The duty cycle and time period of the supply voltage may be modified based on the voltage requirement of the power converter.

Most power conversion applications today have a digital switching controller circuit that uses a single microcontroller to control the frequency and duty cycle of the PWM signals. The power converter can operate in two modes: full-operation mode and standby mode. When the voltage requirement of the power converter is constant for a predetermined time period, the switching controller circuit operates in standby mode. In standby mode, the power converter periodically outputs voltage pulses to the switches. When the voltage requirement of the power converter varies with time, the switching controller circuit operates in full-operation mode in order to regulate the output voltage. The power converter requires high power in full-operation mode and the switching controller circuit outputs a continuous series of pulses of varying pulse widths, where the pulse width is determined by the varying voltage requirement.

The power converter requires very low power in the standby mode and hence, the switching controller circuit periodically outputs bursts of pulses, i.e., the switching controller circuit operates in a burst mode. Since the switching controller circuit comprises only one microcontroller, the cores and memories of the microcontroller operate in both the full and standby modes. This leads to large power consumption by the switching controller circuit, even in the standby mode. Other conventional switched-mode power converters include analog components, in addition to the microcontroller, to control the burst mode of operation in the standby mode, however, analog components increase cost.

A voltage-mode feedback switching controller circuit is another type of switching controller circuit that includes analog components such as a minimum duty cycle generator, a PWM generator, and a burst flip-flop. The PWM generator generates a PWM signal. When the power converter requires low power, the minimum duty cycle generator generates a PWM signal having a minimum duty cycle. When the power converter requires high power, the PWM generator generates a PWM with a varying duty cycle. The burst flip-flop controls the output of the switching controller circuit based on the PWM signal. The switching controller circuit is in standby mode when the output of the burst flip-flop is low, and in full-operation mode when the output of the burst flip-flop is high. However, the analog components such as the PWM generator, the minimum duty cycle generator, and the burst flip-flop decrease the flexibility of the voltage-mode feedback switching controller circuit by increasing the hardware dependency of the circuit.

It would be advantageous to have a low-cost switching controller circuit for a power converter that consumes less power in standby mode.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
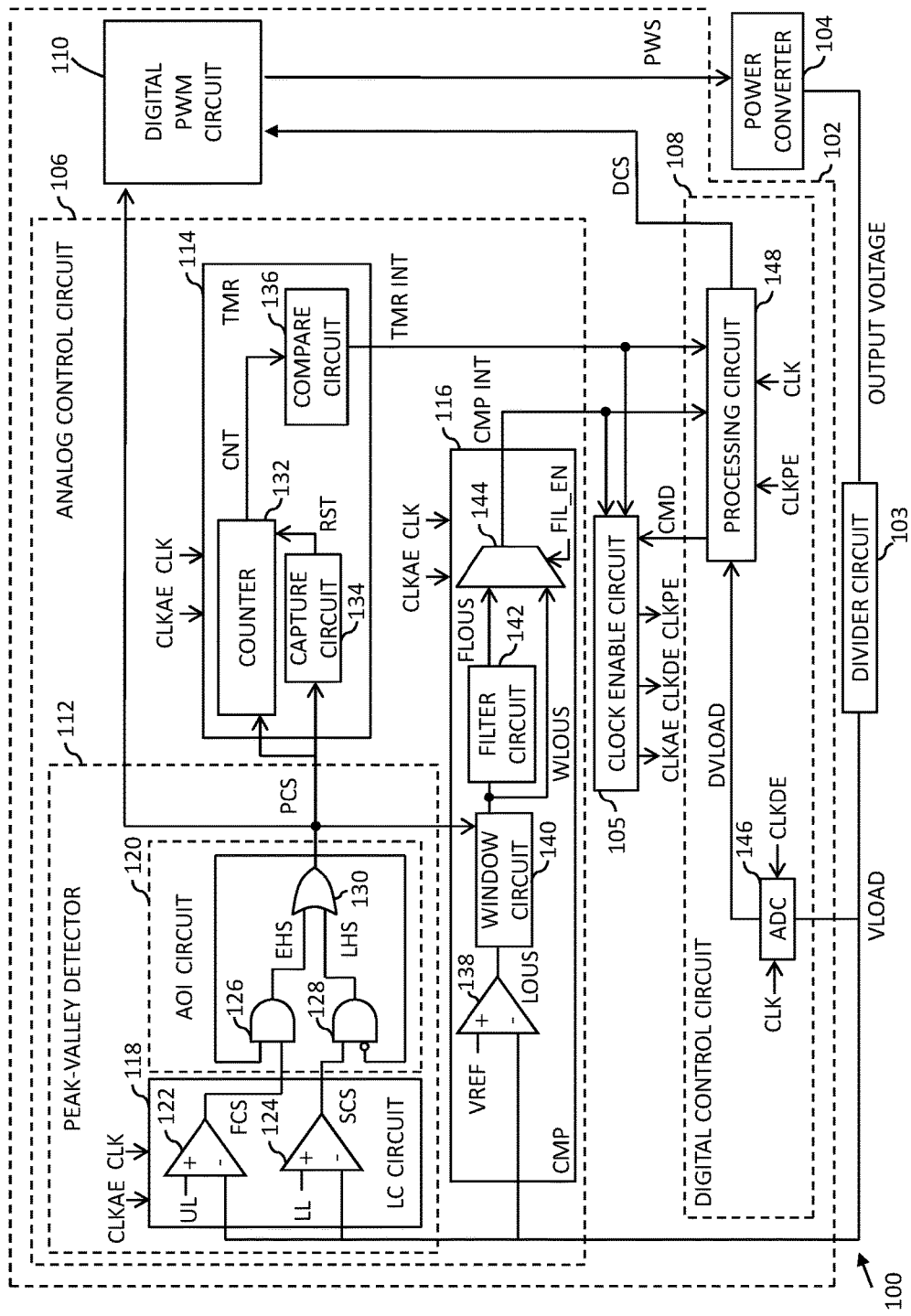
FIG. 1 is a schematic block diagram of a system including a switching controller circuit connected to a divider circuit and a power converter in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In one embodiment, the present invention comprises a switching controller circuit that includes an analog control circuit, a digital control circuit, a clock enable circuit, and a digital pulse width modulation (PWM) circuit. The analog control circuit generates a pulse control signal in a first control mode (i.e., an analog control mode). The analog control circuit includes a peak-valley detector, a comparator circuit, and a timer circuit. The peak-valley detector receives a load voltage signal, an upper-limit voltage signal, a lower-limit voltage signal, a clock signal and an analog clock gate enable signal, and outputs the pulse control signal based on the analog clock gate enable signal. The comparator circuit is connected to the peak-valley detector and receives the load voltage signal, the pulse control signal, the clock signal, and the analog clock gate enable signal. The comparator circuit outputs a comparator interrupt signal based on the load voltage signal, a reference signal, the pulse control signal, and the analog clock gate enable signal. The timer circuit has a predetermined count value stored therein. The timer circuit is connected to the peak-valley detector and receives the pulse control signal therefrom, the clock signal, and the analog clock gate enable signal, and outputs a timer interrupt signal based on the analog clock gate enable signal and the predetermined count value. The digital control circuit includes an analog-to-digital converter (ADC) circuit and a processing circuit. The digital circuit generates a digital control signal in a second control mode (i.e., a digital control mode). The ADC circuit receives the load voltage signal, the clock signal, and a digital clock gate enable signal, and outputs a digitized load voltage signal based on the digital clock gate enable signal. The processing circuit is connected to the ADC circuit, the clock enable circuit, the comparator circuit, and the timer circuit, receives the digitized load voltage signal, a processing clock gate enable signal, the comparator interrupt signal, and the timer interrupt signal therefrom, respectively. The processing circuit receives the clock signal and outputs control mode data and the digital control signal based on the processing clock gate enable signal.

The clock enable circuit is connected to the processing circuit, the timer circuit, and the comparator circuit, receives the control mode data, the timer interrupt signal, and the comparator interrupt signal, and outputs the analog clock gate enable signal, the digital clock gate enable signal, and the processing clock gate enable signal based on the control mode data, the timer interrupt (TMR INT), and the comparator interrupt (CMP INT). When the clock enable circuit outputs the analog clock gate enable signal at a first logic state, and the digital clock gate enable signal and the processing clock gate enable signal at a second logic state, then the switching controller circuit operates in the first control mode. Conversely, when the clock enable circuit outputs the analog clock gate enable signal at the second logic state, and the digital clock gate enable signal and the processing clock gate enable signal are at the first logic state, then the switching controller circuit operates in the second control mode. The digital PWM circuit, connected to the analog control circuit and the digital control circuit, receives the pulse control signal and the digital control signal, and outputs a pulse wave signal. The digital PWM circuit receives the pulse control signal when the analog clock gate enable signal is at the first logic state, and the digital PWM circuit receives the digital control signal when the digital clock gate enable signal and the processing clock gate enable signal are at the first logic state.

In another embodiment, the present invention comprises a switching controller circuit that includes an analog control circuit, a digital control circuit, a clock enable circuit, and a digital PWM circuit. The analog control circuit generates a pulse control signal in a first control mode (i.e., an analog mode). The analog control circuit includes a peak-valley detector, a comparator circuit, and a timer circuit. The peak-valley detector receives a load voltage signal, an upper-limit voltage signal, a lower-limit voltage signal, a clock signal and an analog clock gate enable signal, and outputs the pulse control signal based on the analog clock gate enable signal. The comparator circuit is connected to the peak-valley detector and receives the load voltage signal, the clock signal, and the analog clock gate enable signal, and outputs a comparator interrupt signal based on the analog clock gate enable signal. The comparator circuit includes a comparator, a window circuit, a filter circuit, and a multiplexer. The comparator receives the load voltage signal and a reference signal, and outputs a load output under-voltage signal. The window circuit is connected to the peak-valley detector and the comparator, receives the pulse control signal and the load output under-voltage signal, and outputs a windowed load output under-voltage signal. The filter circuit is connected to the window circuit, receives the windowed load output under-voltage signal, and outputs a filtered load output under-voltage signal. The multiplexer is connected to the window circuit and the filter circuit, receives the windowed load output under-voltage signal and the filtered load output under-voltage signal, respectively, and a filter enable signal, and outputs the comparator interrupt signal based on the filter enable signal.

The timer circuit stores a predetermined count value. The timer circuit is connected to the peak-valley detector and receives the pulse control signal, the clock signal, and the analog clock gate enable signal, and outputs a timer interrupt signal based the analog clock gate enable signal and the predetermined count value. The timer circuit includes a counter, a capture circuit, and a compare circuit. The counter receives a reset signal, the pulse control signal, and the clock signal, and outputs a count signal based on the clock signal, the pulse control signal, and the reset signal. The capture circuit is connected to the peak-valley detector, receives the pulse control signal, and outputs the reset signal based on the pulse control signal. The compare circuit is connected to the counter, receives the count signal, and outputs the timer interrupt signal based on the count signal and the predetermined count value. The digital circuit generates a digital control signal in the second control mode (i.e., a digital control mode). The digital circuit includes an analog-to-digital converter (ADC) circuit, and a processing circuit. The ADC circuit receives the load voltage signal, the clock signal, and a digital clock gate enable signal, and outputs a digitized load voltage signal based on the digital clock gate enable signal. The processing circuit is connected to the ADC circuit and the clock enable circuit, and receives the digitized load voltage signal and the processing clock gate enable signal, respectively. The processing circuit receives the clock signal and the processing clock gate enable signal, and outputs control mode data, and the digital control signal based on the processing clock gate enable signal. The clock enable circuit is connected to the processing circuit, the timer circuit, and the comparator circuit, receives the control mode data, the timer interrupt signal (TMR INT), and the comparator interrupt signal (CMP INT), respectively, and outputs the analog clock gate enable signal, the digital clock gate enable signal, and the processing clock gate enable signal based on the control mode data. When the clock enable circuit outputs the analog clock gate enable signal at a first logic state (i.e., active state), and the digital clock gate enable signal and the processing clock gate enable signal at a second logic state (i.e., not active), the switching controller circuit operates in the first control mode. When the clock enable circuit outputs the analog clock gate enable signal at the second logic state, and the digital clock gate enable signal and the processing clock gate enable signal at the first logic state, the switching controller circuit operates in the second control mode. The digital PWM circuit is connected to the analog and the digital control circuits, receives a selected one of the pulse control signal and the digital control signal, and outputs a pulse wave signal corresponding to the selected one of the pulse control signal and the digital control signal. The digital PWM circuit receives the pulse control signal when the analog clock gate enable signal is at the first logic state. The digital PWM circuit receives the digital control signal when the digital clock gate enable signal and the processing clock gate enable signal are at the first logic state. Thus, the switching controller circuit operates in either an analog control mode or a digital control mode.

Various embodiments of the present invention provide a switching controller circuit for a power converter that includes analog and digital control circuits, a clock gate enable circuit, and a digital PWM circuit. The analog control circuit includes a peak-valley detector, a comparator circuit, and a timer circuit. The digital control circuit includes an ADC circuit and a processing circuit. The clock enable circuit receives the control mode data, the timer interrupt signal (TMR INT), and the comparator interrupt signal (CMP INT), respectively, and outputs the analog clock gate enable signal, the digital clock gate enable signal, and the processing clock gate enable signal at one of first and second logic states based on the control mode data. When the clock enable circuit outputs the analog clock gate enable signal at the first logic state, and the digital clock gate enable and processing clock gate enable signals at the second logic state, the switching controller circuit operates in the first control mode, which is an analog control mode. When the clock enable circuit outputs the analog clock gate enable signal at the second logic state, and the digital clock gate enable and processing clock gate enable signals at the first logic state, the switching controller circuit operates in the second control mode, which is a digital control mode. The digital pulse width modulation (PWM) circuit receives a selected one of the pulse control signal and the digital control signal, and outputs a pulse wave signal. When the power converter enters a standby mode, the processing circuit switches the control mode of the switching controller circuit from digital to analog control mode. The switching controller circuit continues operating in the analog control mode until the comparator interrupt signal switches to the first logic state. Further, if the switching controller circuit continues to operate in the analog control mode beyond a predetermined time period, the timer circuit generates a timer interrupt signal. When the clock enable circuit receives either of the timer interrupt and comparator interrupt signals at the first logic state, the clock enable circuit switches the processing clock gate enable signal from the second logic state to the first logic state. Further, the processing circuit receives the processing clock gate enable signal at first logic state and switches the switching controller circuit from the analog control mode to the digital control mode.

The switching controller circuit uses fewer components than conventional switching controller circuits to operate and toggle between the analog and digital control modes, thereby reducing the cost of the switching controller circuit. The digital control circuit also does not receive the clock signal and thus does not operate when the switching controller circuit is in the analog mode. Similarly, the analog control circuit does not receive the clock signal and thus does not operate when the switching controller circuit is in the digital mode. In the analog control mode, when either of the comparator and timer interrupts toggles from low to high, the clock enable circuit outputs the processing clock gate enable (high active). When the processing clock gate enable signal is high, the processing circuit is operational. Thus, the processing circuit does not consume power when the switching controller circuit is operating in the analog control mode. The switching controller circuit hence consumes less power when the analog control circuit is in operation. The processing circuit also can be programmed to implement multiple functions in the digital control mode, thereby increasing the flexibility of the switching controller circuit.

Referring now to FIG. 1, a schematic block diagram of a system 100 including a switching controller circuit 102 connected to a divider circuit 103 and a power converter 104 in accordance with an embodiment of the present invention is shown. The switching controller circuit 102 provides pulse wave signals (pulse width modulated signals, PWS) to the power converter 104. The power converter 104 main- tains a constant voltage supply from a voltage source (not shown) across a load (not shown) of the power converter 104.

The switching controller circuit 102 includes a clock enable circuit 105, analog and digital control circuits 106 and 108, and a digital pulse width modulation (PWM) circuit 110. The analog control circuit 106 includes a peak-valley detector 112, a timer circuit 114, and a comparator circuit 116. The peak-valley detector 112 includes a level comparator (LC) circuit 118 and an AND-OR-Invert (AOI) circuit 120. The LC circuit 118 includes first and second comparators 122 and 124. The AND-OR-Invert (AOI) circuit 120 includes first and second AND gates 126 and 128, and an OR gate 130. The timer circuit 114 includes a counter 132, a capture circuit 134, and a compare circuit 136. The comparator circuit 116 includes a third comparator 138, a window circuit 140, a filter circuit 142, and a multiplexer 144. The digital control circuit 108 includes an analog-to-digital convertor (ADC) circuit 146 and a processing circuit 148. The analog control circuit 106 is connected to the clock enable circuit 105.

The power converter 104 receives the pulse wave signals (PWS) from the switching controller circuit 102, and generates an output voltage (OV) signal. The divider circuit 103 receives the OV signal, and outputs a load voltage signal (VLOAD). In one embodiment, the OV signal ranges between 0 volts (V) and 24V and the load voltage signal (VLOAD) ranges between OV and 3.3V. The ADC circuit 146 is connected to the divider circuit 103, receives the load voltage signal (VLOAD) and outputs a digitized load voltage signal (DVLOAD). The ADC circuit 146 also receives a clock signal (CLK). The clock signal may be generated either by an external clock or an internal oscillator (both not shown). The processing circuit 148 is connected to the ADC circuit 146, the timer circuit 114, and the comparator circuit 116, and receives the digitized load voltage signal (DVLOAD), a timer interrupt signal (TMR INT), and a comparator interrupt signal (CMP INT), respectively. The processing circuit 148 generates control mode data (CMD) and a digital control signal (DSC). The processing circuit 148 also receives the clock signal (CLK). The clock enable circuit 105 is connected to the comparator circuit 116, the timer circuit 114, and the processing circuit 148, and receives the comparator interrupt signal (CMP INT), the timer interrupt signal (TMR INT), and the control mode data (CMD), respectively. The clock enable circuit 105 generates an analog clock gate enable signal (CLKAE), a digital clock gate enable signal (CLKDE), and a processing clock gate enable signal (CLKPE).

When the clock enable circuit 105 generates the digital clock gate enable signal (CLKDE) and the processing clock gate enable signal (CLKPE) at logic high state (also referred to as "first logic state", and which in this embodiment the signal is high active), the processing circuit 148 outputs the digital control signal (DCS). The switching controller circuit will now operate in a digital control mode.

The digital PWM circuit 110 is connected to the processing circuit 148, and receives the digital control signal (DCS) and outputs the pulse wave signals (PWS) based on the digital control signal (DCS). In one embodiment, a pulse width of the pulse wave signal (PWS) during an on-time is proportional to the voltage of the digital control signal (DCS). When the voltage requirement of the power converter 104 is constant for a predetermined amount of time, the switching controller circuit 102 operates in standby mode. The standby mode is also referred to as an 'analog control mode'. When the voltage requirement of the power converter 104 varies with time, the switching controller circuit 102 operates in full-operation mode for regulating the output voltage of the power converter 104. The full-operation is also referred to as the 'digital control mode'.

When the power converter 104 operates in standby mode, the power converter 104 consumes very low power from the voltage source. The switching controller circuit 102, which is operating in the digital control mode, detects the standby mode and the processing circuit 148 outputs the control mode data (CMD). The clock enable circuit 105 receives the control mode data (CMD), and generates the analog clock gate enable signal (CLKAE) at logic high state and the digital clock gate enable signal (CLKDE) and the processing clock gate enable signal (CLKPE) at logic low state, thereby switching the switching controller circuit 102 to the analog control mode.

In one embodiment, the switching controller circuit 102, operates in the digital control mode and detects the standby mode of the power converter 104 when an off time of the pulse wave signal (PWS) exceeds a predefined maximum time.

When the power converter 104 is in the standby mode, the power converter 104 consumes very low power from the voltage source, the switching controller circuit 102 operates in the analog control mode, and the pulse wave signal (PWS) is a burst signal. Upon receiving the analog clock gate enable signal (CLKAE) from the clock enable circuit 105, the analog control circuit 106 becomes operational. The peak-valley detector 112 is connected to the divider circuit 103, receives the load voltage signal (VLOAD), and outputs a pulse control signal (PCS). The LC circuit 118 receives a clock signal (CLK). The clock signal may be generated either from an external clock signal or an internal oscillator (neither of which is shown). The first comparator 122 receives the load voltage signal (VLOAD) and an upper-limit voltage (UL), and generates a first comparison signal (FCS). The second comparator 124 receives the load voltage signal (VLOAD) and a lower-limit voltage (LL), and generates a second comparison signal (SCS). The first AND gate 126 is connected to the first comparator 122, receives the first comparison signal (FCS) and the pulse control signal (PCS), and generates an error hold signal (EHS). The second AND gate 128 is connected to the second comparator 124, receives the second comparison signal (SCS) and an inverted pulse control signal (PCS'), and generates a loss hold signal (LHS). The OR gate 130 is connected to the first and second AND gates 126 and 128, receives the error hold signal (EHS) and the loss hold signal (LHS), respectively, and generates the pulse control signal (PCS).

The capture circuit 134 is connected to the peak-valley detector 112, receives the pulse control signal (PCS), and generates a reset signal (RST). The counter 132 receives the clock signal (CLK) and the pulse control signal (PCS), and outputs a total number of clock cycles of the clock signal (CLK) as a count signal (CNT) when the pulse control signal (PCS) is high. Upon receiving the reset signal (pulse signals, RST) from the capture circuit 134, the counter 132 resets a count value of the count signal (CNT) to zero. The compare circuit 136 is connected to the counter 132, receives the count signal (CNT), and compares the number of clock cycles with a predetermined count value stored therein. Based on the comparison, the compare circuit 136 generates a timer interrupt signal (TMR INT).

The third comparator 138 is connected to the divider circuit 103, receives the load voltage signal (VLOAD) and a reference signal (VREF), and generates a load output under-voltage (LOUS). The window circuit 140 is connected to the third comparator 138, receives the load output under-voltage signal (LOUS), and generates a windowed load output under-voltage signal (WLOUS). The filter circuit 142 is connected to the window circuit 140, receives the windowed load output under-voltage signal (WLOUS), and generates a filtered load output under-voltage signal (FLOUS). The multiplexer 144 is connected to the window circuit 140 and the filter circuit 142 to receive the windowed load output under-voltage signal (WLOUS) and the filtered load output under-voltage signal (FLOUS), respectively. The multiplexer 144 receives a filter enable signal (FIL_EN) as a select signal, and outputs one of the windowed load output under-voltage signal (WLOUS) and the filtered load output under-voltage signal (FLOUS) as a comparator interrupt signal (CMP INT).

When the first and second comparison signals (FCS) and (SCS) are high, the pulse control signal (PCS) is high. When the first and second comparison signals (FCS) and (SCS) are low, the pulse control signal (PCS) is low. When either the first comparison signal (FCS) is low and the second comparison signal (SCS) is high, or the first comparison signal (FCS) is high and the second control signal (SCS) is low, the pulse control signal (PCS) retains its previous logic state, which may be either of high or low.

When either the comparator interrupt signal (CMP INT) or the timer interrupt signal (TMR INT) toggles from low to high, the clock enable circuit 105 outputs the processing clock gate enable signal (CLKPE) at logic high state. The clock enable circuit 105 outputs the analog clock gate enable signal at logic low state and the digital clock gate enable signal at logic low state. The processing circuit 148 receives the logic high processing clock gate enable signal and determines which of the comparator interrupt signal (CMP INT) and the timer interrupt signal (TMR INT) is at logic high state. The processing circuit 148, thus, outputs the control mode data corresponding to the digital control mode. The clock enable circuit 105 outputs the digital clock gate enable signal (CLKDE) at logic high state and the analog clock gate enable signal (CLKAE) at logic low state, thereby switching the switching controller circuit 102 from the analog control mode to the digital control mode. Further, the LC circuit 118, the comparator circuit 116, and the timer circuit 114 receive the clock signal (CLK) when the analog clock gate enable signal is high. The ADC circuit 146 and the processing circuit 148 receive the clock signal (CLK) when the digital clock gate enable signal and the processing clock gate enable signal are high, respectively.

Figure 2:
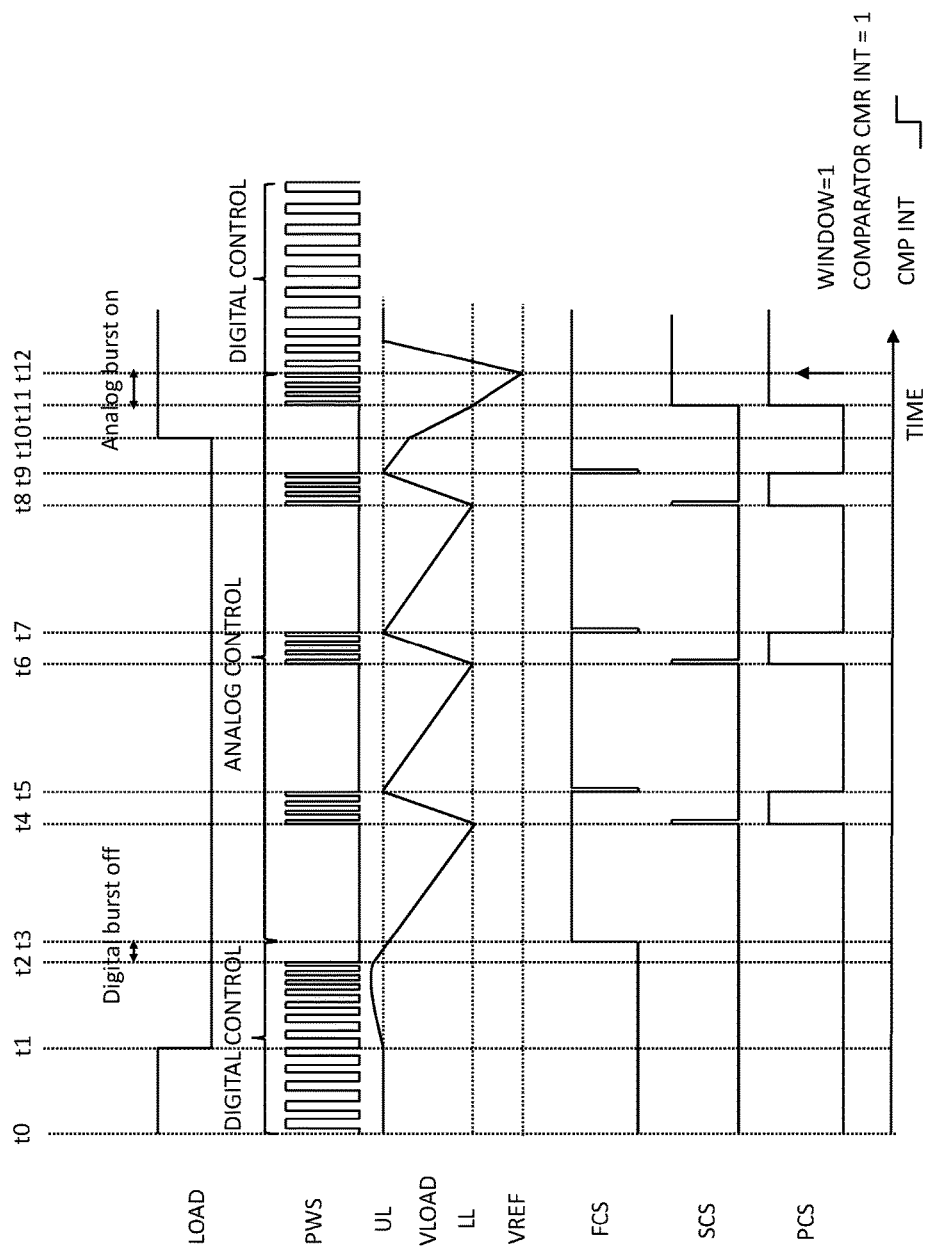
FIG. 2 is a timing diagram illustrating various signals of the switching controller circuit of FIG. 1 in accordance with an embodiment of the present invention.

Referring now to FIG. 2, a timing diagram illustrating a load signal (LOAD), the pulse wave signal (PWS), the upper-limit voltage signal (UL), the load voltage signal (VLOAD), the lower-limit voltage signal (LL), the voltage reference signal (VREF) the first comparison signal (FCS), the second comparison signal (SCS), and the pulse control signal (PCS) of the switching controller circuit 102 of FIG. 1 in accordance with an embodiment of the present invention is shown. The load signal (LOAD) corresponds to power required by the load of the power converter 104 during a loading condition. When the load signal (LOAD) is low, the load consumes very little power and when the load signal (LOAD) is not low, then the load consumes more power. When the load signal (LOAD) is low, the power converter 104 consumes less power from the voltage source by way of the pulse wave signal (PWS). This is achieved by providing the burst mode operation of the pulse wave signal (PWS). Thus, logic low state of the load signal (LOAD) corresponds to the standby condition of the power converter 104.

At time t1, the power converter 104 enters into the standby mode. The power requirement of the power converter 104 is reduced and the load signal (LOAD) drops to logic low state. In the meantime, the load voltage signal (VLOAD) increases. The ADC circuit 146 receives the increased load voltage signal (VLOAD) and generates an increased digitized load voltage signal (DVLOAD). The processing circuit 148 receives the increased digitized load voltage signal (DVLOAD) and outputs the digital control signal (DCS). The PWM circuit 110 receives the digital control signal (DCS) and outputs the pulse wave signal (PWS) with an increased frequency and decreased pulse width. The pulse wave signal (PWS) attains a maximum frequency and a minimum pulse width.

At time t2, the processing circuit 148 outputs the digital control signal (DCS) to the digital PWM circuit 110. The digital control signal (DCS) has a minimum value i.e., the digital control signal (DCS) is at logic low state. Consequently, the digital PWM circuit 110 outputs the PWS as a ground signal. The processing circuit 148 checks if an off time of the PWS exceeds the predefined maximum time. When the off time of the PWS exceeds the predefined maximum time, the processing circuit 148 determines that the power converter 104 is operating in the standby mode, and stores a standby status using a standby status flag (not shown). The standby status corresponds to the standby mode of the power converter 104.

In the standby mode, the processing circuit 148 outputs the control mode data (CMD). The clock enable circuit 105 receives the control mode data (CMD) and outputs the analog clock gate enable signal (CLKAE) at logic high state, and the digital clock gate enable signal (CLKDE) and the processing clock gate enable signal (CLKPE) at logic low state.

At time t3, the clock enable circuit 105 receives the control mode data (CMD) and outputs the analog clock gate enable signal (CLKAE) at logic high state, and the digital clock gate enable signal (CLKDE) and the processing clock gate enable signal (CLKPE) at logic low states. When the analog clock gate enable signal (CLKAE) is high and the digital clock gate enable signal (CLKDE) is low, the switching controller circuit 102 operates in the analog control mode. Further, the peak-valley detector 112, the timer circuit 114, and the comparator circuit 116 receive the clock signal (CLK). As the voltage level of the load voltage signal (VLOAD) is less than a voltage level of the upper-limit voltage signal (UL), the first comparator 122 outputs the first comparison signal (FCS) at logic high state. The voltage level of the load voltage signal (VLOAD) is greater than a voltage level of the lower-limit voltage signal (LL) and hence, the second comparator 124 outputs the second comparison signal (SCS) at logic low state. The first AND gate 126 receives the first comparison signal (FCS) at logic low state and the pulse control signal (PCS), and outputs the error hold signal (EHS) at logic low state. The second AND gate 128 receives the second comparison signal (SCS) at logic high state and the inverted pulse control signal (PCS'), and outputs the loss hold signal (LHS) at logic low state. The OR gate 130 receives the error hold signal (EHS) at logic low state and the loss hold signal (LHS) at logic low state, and outputs the pulse control signal (PCS) at logic low state. The digital PWM circuit 110 receives the pulse control signal (PCS) at logic low state, and outputs the PWS at a logic low state.

At time t4, the voltage level of the load voltage signal (VLOAD) is less than the voltage level of the lower-limit voltage signal (LL). Thus, the second comparator 124 outputs the second comparison signal (SCS) at logic high state. The second AND gate 128 receives the second comparison signal (SCS) at logic high state and the inverted pulse control signal (PCS') at logic high state, and outputs the loss hold signal (LHS) at logic high state. The OR gate 130 receives the error hold signal (EHS) at logic low state the loss hold signal (LHS) at logic high state, and outputs the pulse control signal (PCS) at logic high state. The digital PWM circuit 110 receives the pulse control signal (PCS) at logic high state, and outputs the pulse wave signal (PWS) at a constant preset pulse width and frequency. In one embodiment, the digital PWM circuit 110 receives the pulse control signal (PCS) at logic high state and outputs the pulse wave signal (PWS) at a frequency of 100 KHz and having a duty cycle of 0.3.

At time t5, the voltage level of the load voltage signal (VLOAD) is greater than the voltage level of the upper-limit voltage signal (UL). Thus, the first comparator 122 outputs the first comparison signal (FCS) at logic low state. The first AND gate 126 receives the first comparison signal (FCS) at logic low state and the pulse control signal (PCS) at logic high state, and outputs the error hold signal (EHS) at logic low state. The OR gate 130 receives the error hold signal (EHS) at logic low state and the loss hold signal (LHS) at logic low state, and outputs the pulse control signal (PCS) at logic low state. The digital PWM circuit 110 receives the pulse control signal (PCS) at logic low state, and outputs the pulse wave signal (PWS) as a ground signal. The aforementioned process at time t4 repeats at times t6 and t8 and the process at time t5 repeats at times t7 and t9.

At time t10, the load signal toggles from low to high and the power converter 104 exits the standby mode. Thus, the voltage level of the load voltage signal (VLOAD) is reduced at a fast rate.

At time t11, the voltage of the load voltage signal (VLOAD) falls below the lower-limit voltage signal (LL). Thus, the second comparator 124 outputs the second comparison signal (SCS) at logic high state. The second AND gate 128 receives the second comparison signal (SCS) at logic high state and the inverted pulse control signal (PCS') at logic high state, and outputs the loss hold signal (LHS) at logic high state. The OR gate 130 receives the error hold signal (EHS) at logic low state the loss hold signal (LHS) at logic high state, and outputs the pulse control signal (PCS) at logic high state. The digital PWM circuit 110 receives the pulse control signal (PCS) at logic high state and outputs the pulse wave signal (PWS) at the constant preset pulse width and frequency. The power converter 104 is in the full-operation mode and continues to consume high power. Thus, the voltage level of the load voltage signal (VLOAD) is further decreased.

At time t12, the voltage level of the load voltage signal (VLOAD) is less than the voltage level of the first voltage reference (VREF). Thus, the comparator circuit 116 toggles the load output under-voltage signal (LOUS) from low to high. The window circuit 140 receives the load output under-voltage signal (LOUS) at logic high state and toggles the windowed load output under-voltage signal (WLOUS) from low to high. The filter circuit 142 receives the windowed load output under-voltage signal (WLOUS) and toggles the filtered load output under-voltage signal (FLOUS) from low to high. The multiplexer 144 receives the windowed load output under-voltage signal (WLOUS) at logic high state, the filtered load output under-voltage signal (FLOUS) at logic high state, and the filter enable signal (FIL_EN) as a select signal, and outputs either the windowed load output under-voltage signal (WLOUS) or the filtered load output under-voltage signal (FLOUS) as the comparator interrupt signal (CMP INT). In one embodiment, the multiplexer 144 outputs the filtered load output under-voltage signal (FLOUS) as the comparator interrupt signal (CMP INT) when the filter enable signal (FIL_EN) is high. The multiplexer 144 outputs the windowed load output under-voltage (WLOUS) signal as the comparator interrupt signal (CMP INT) when the filter enable signal (FIL_EN) is low. The clock enable circuit 105 receives the comparator interrupt signal (CMP INT) at logic high state, and outputs the processing clock gate enable signal (CLKPE) at logic high state. The processing circuit 148 receives the processing clock gate enable signal (CLKPE) and the clock signal (CLK). The processing circuit 148 also receives the comparator interrupt signal (CMP INT), and generates the control mode data (CMD) corresponding to the digital clock gate enable signal (CLKDE). The clock enable circuit 105 receives the control mode data (CMD) and outputs the analog clock gate enable signal (CLKAE) at logic low state and the digital clock gate enable signal (CLKDE) at logic high state. When the analog clock gate enable signal (CLKAE) is low and the digital clock gate enable signal (CLKDE) is high, the switching controller circuit 102 operates in a digital control mode. The processing circuit 148 and the ADC circuit 146 also receive the clock signal (CLK). The ADC circuit 146 receives the load voltage signal (VLOAD) and generates the digitized load voltage signal (DVLOAD). The processing circuit 148 receives the digitized load voltage signal (DVLOAD) and outputs a corresponding digital control signal (DCS). The digital PWM circuit 110 modifies the pulse width and frequency of the pulse wave signal (PWS) based on the voltage of the digital control signal (DCS).

Figure 3:
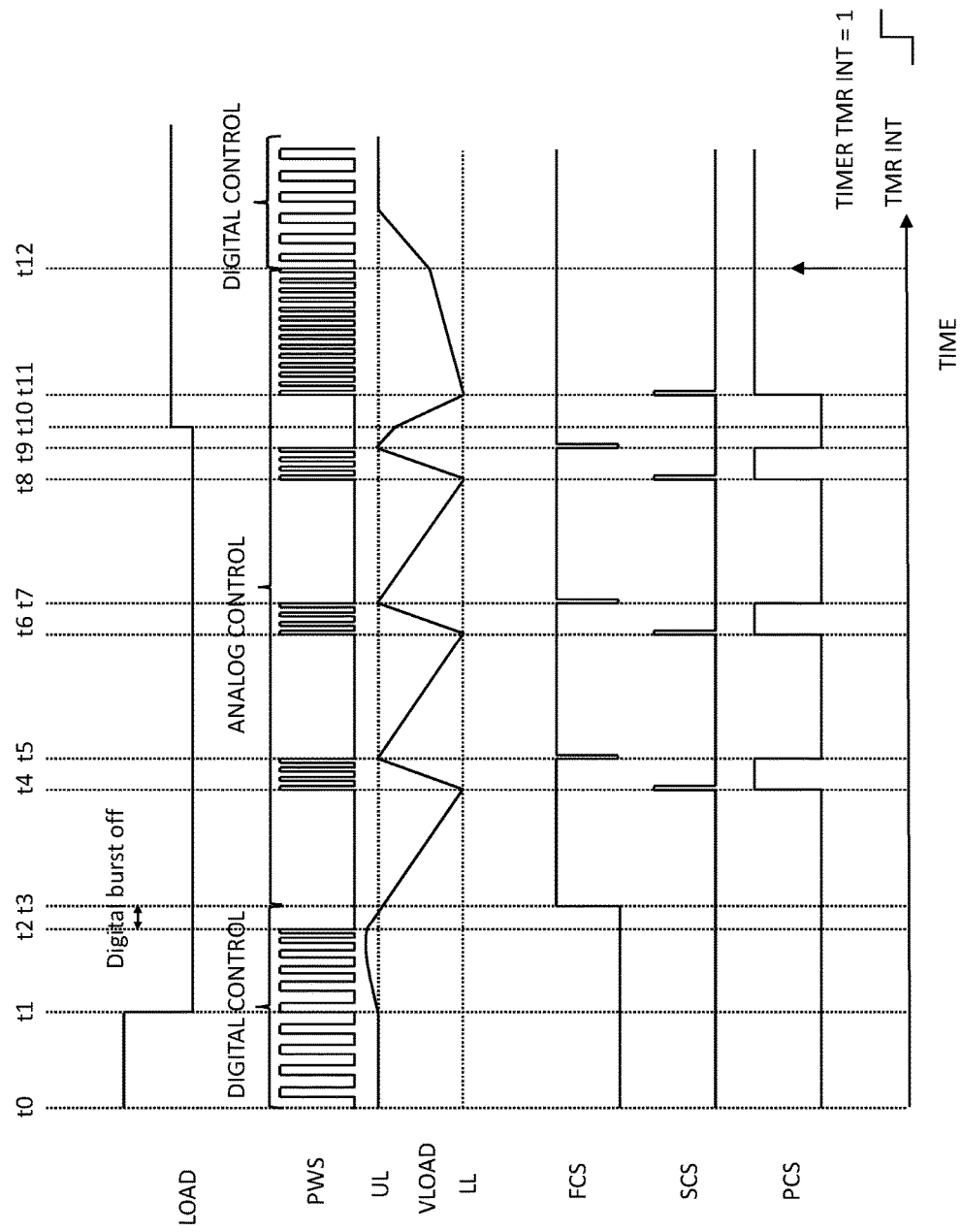
FIG. 3 is a timing diagram illustrating various signals of the switching controller circuit of FIG. 1 in accordance with another embodiment of the present invention.

Referring now to FIG. 3, a timing diagram illustrating the load signal (LOAD), the pulse wave signal (PWS), the upper-limit voltage signal (UL), the load voltage signal (VLOAD), the lower-limit voltage signal (LL), the first comparison signal (FCS), the second comparison signal (SCS), and the pulse control signal (PCS) of the switching controller circuit 102 of FIG. 1 in accordance with an embodiment of the present invention is shown. The timing diagram from times t1 to t9 is similar to the timing diagram from times t1 to t9 of FIG. 2.

Further, at times t5, t7, and t9, the pulse control signal (PCS) toggles from high to low. When the pulse control signal (PCS) toggles from high to low, the capture circuit 134 generates the reset signal (RST) as a pulse signal. The counter 132 receives the reset signal (RST) and resets the count value of the count signal (CNT) to zero.

At time t10, the power converter 104 consumes high power. The voltage level of the load signal (LOAD) is increased by a small value. The power converter 104 operates in the standby mode. The power converter 104 receives the pulse wave signal (PWS) from the switching controller circuit 102 at logic low state. Thus, there is no power supplied to the load by the power converter 104. Hence, the voltage level of the load voltage signal (VLOAD) is decreased.

At time t11, the voltage level of the load voltage signal (VLOAD) is less than the voltage level of the lower-limit voltage signal (LL). The second comparator 124 outputs the second comparison signal (SCS) at logic high state. The second AND gate 128 receives the second comparison signal (SCS) from the second comparator 124 and the inverted pulse control signal (PCS') from the OR gate 130 at logic high state and outputs the loss hold signal (LHS) at logic high state. The OR gate 130 receives the error hold signal (EHS) from the first AND gate 126, the loss hold signal (LHS) from the second AND gate 128 and outputs the pulse control signal (PCS) at logic high state. The digital PWM circuit 110 receives the pulse control signal (PCS) from the OR gate 130 and outputs the pulse wave signal (PWS) at the constant preset pulse width and frequency. The switching controller circuit 102 operates in the analog control mode for the predetermined time period. The voltage level of the load voltage signal (VLOAD) is less than the voltage level of the upper-limit voltage signal (UL).

At time t12, the counter 132 outputs the count signal (CNT) based on the clock signal (CLK). The compare circuit 136 is connected to the counter 132, receives the count signal (CNT), and compares the total number of clock cycles with the predetermined count value stored therein. Since the total number of clock cycles is greater than the predetermined count value, the compare circuit 136 toggles the timer interrupt (TMR INT) from low to high. The clock enable circuit 105 receives the timer interrupt signal (TMR INT) from the compare circuit 136, and outputs the processing clock gate enable signal (CLKPE) at logic high state. Upon receiving the processing clock gate enable signal (CLKPE) from the clock enable circuit 105, the processing circuit 148 becomes operational and receives the clock signal (CLK). Further, the processing circuit 148 receives the timer interrupt signal (TMR INT) from the compare circuit 136 and generates control mode data (CMD). The clock enable circuit 105 receives the control mode data (CMD) from the processing circuit 148, and outputs the analog and digital clock gate enable signals (CLKAE and CLKDE) at low and high states, respectively. When the analog clock gate enable signal (CLKAE) is low and the digital clock gate enable signal (CLKDE) is high, the switching controller circuit 102 operates in the digital control mode. Upon receiving the digital clock gate enable signal (CLKDE) at logic high state, the ADC circuit 146 become operational and receives the clock signal (CLK). The ADC circuit 146 receives the load voltage signal (VLOAD) and generates the digitized load voltage signal (DVLOAD). The processing circuit 148 receives the digitized load voltage signal (DVLOAD), and outputs a corresponding digital control signal (DCS). The digital PWM circuit 110 modifies the pulse width of the pulse wave signal (PWS) based on the voltage of the digital control signal (DCS).

During the analog control mode, the digital control circuit 108 does not receive the clock signal (CLK) and hence, does not consume power. This results in reduced power consumption of the switching controller circuit 102. During the digital control mode, the analog control circuit 106 does not receive the clock signal (CLK) and hence, does not consume additional power. Thus, the switching controller circuit 102 consumes very little power during standby mode of the power converter 104. Further, the analog control circuit 106 includes simple and low cost components such as the counter 132, the first through third comparators 122, 124, and 138, the first and second AND gates 126 and 128, and the OR gate 130. These components may be a part of a microcontroller, thereby reducing the cost of the switching controller circuit 102 even more. Further, the processing circuit 148 can be programmed to implement multiple functions in the digital control mode, thereby increasing the flexibility of the switching controller circuit 102. Generally, in a conventional switching controller circuit, a digital control circuit provides continuous regulation of the pulse wave signal (PWS). This leads to an increase in the power consumed by the conventional switching controller circuit. However, the switching controller circuit 102 of the present invention has both analog and digital control circuits 106 and 108, alternately, for regulating the pulse wave signal (PWS), thereby reducing the power consumed by the switching controller circuit 102.

The terms first and second logic states, and active and inactive, have been used herein to distinguish between high and low signals. For example, the first logic state could signify a signal that is 0v, while the second logic state would then indicate a signal that has a logical '1' value, with the actual voltage value for logic 1 depending on circuit technology. The circuits described herein also can be designed using either positive or negative logic, so an active signal in one embodiment could be a logic '0' and an inactive signal would then have a logic value of '1'.

It will be understood by those of skill in the art that the same logical functions may be performed by different arrangements of logic gates, or that logic circuits may operate using either positive or negative logic signals (i.e. high active or low active). Therefore, variations in the arrangement of some of the logic gates described above should not be considered to depart from the scope of the present invention.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A switching controller circuit that is operable in at least one of first and second control modes, comprising:
   an analog control circuit that generates a pulse control signal in the first control mode, wherein the analog control circuit includes:
      a peak-valley detector that receives an analog clock gate enable signal and generates the pulse control signal;
      a comparator circuit that receives a reference signal, a load voltage signal, a clock signal, and the analog clock gate enable signal, and is connected to the peak-valley detector for receiving the pulse control signal, and that generates a comparator interrupt signal; and
      a timer circuit that receives the analog clock gate enable signal, and is connected to the peak-valley detector for receiving the pulse control signal, and that generates a timer interrupt signal based on a predetermined count value;
   a digital control circuit that generates a digital control signal in the second control mode, wherein the digital control circuit includes:
      an analog-to-digital converter (ADC) circuit that receives the load voltage signal, the clock signal, and a digital clock gate enable signal and outputs a digitized load voltage signal; and
      a processing circuit that receives a processing clock gate enable signal and the clock signal, and is connected to the ADC circuit for receiving the digitized load voltage signal, the timer circuit for receiving the timer interrupt signal, and the comparator circuit for receiving the comparator interrupt signal, wherein the processing circuit outputs control mode data and the digital control signal;
   a clock enable circuit connected to the comparator circuit, the timer circuit, and the processing circuit for receiving the comparator interrupt signal, the timer interrupt signal, and the control mode data, respectively, wherein the clock enable circuit generates the analog clock gate enable signal, the digital clock gate enable signal, and the processing clock gate enable signal, wherein:
      the switching controller circuit operates in the first control mode when the analog clock gate enable signal is active, and the digital clock gate enable signal and the processing clock gate enable signal are not active; and
      the switching controller circuit operates in the second control mode when the analog clock gate enable signal is not active, and the digital clock gate enable signal and the processing clock gate enable signal are active; and
   a digital pulse width modulation (PWM) circuit connected to the analog and digital control circuits, wherein the digital PWM circuit receives the pulse control signal from the analog control circuit when the clock enable circuit outputs the analog clock gate enable signal, the digital control signal from the digital control circuit when the clock enable circuit outputs the digital clock gate enable signal, and outputs a pulse wave signal corresponding to at least one of the pulse control signal and the digital control signal.

2. The switching controller circuit of claim 1, wherein the peak-valley detector includes:
   a level comparator circuit that generates first and second comparison signals based on the load voltage signal and the analog clock gate enable signal; and
   an AND-OR-Invert (AOI) circuit, connected to the level comparator circuit for receiving the first and second comparison signals, and generating the pulse control signal.

3. The switching controller circuit of claim 1, wherein the comparator circuit includes:
   a comparator that receives the load voltage signal and the reference signal, and generates a load output under-voltage signal;
   a window circuit, connected to the peak-valley detector and the comparator for receiving the pulse control signal and the load output under-voltage signal, respectively, that outputs a windowed load output under-voltage signal;
   a filter circuit connected to the window circuit for receiving the windowed load output under-voltage signal, and generating a filtered load output under-voltage signal; and
   a multiplexer, connected to the window circuit and the filter circuit for receiving the windowed load output under-voltage signal and the filtered load output under-voltage signal, respectively, that outputs the comparator interrupt signal based on a filter enable signal.

4. The switching controller circuit of claim 1, wherein the timer circuit includes:
   a counter that generates a count signal based on the clock signal, the pulse control signal, and the reset signal;
   a capture circuit, connected to the peak-valley detector for receiving the pulse control signal, that generates the reset signal; and
   a compare circuit, connected to the counter that receives the count signal, that generates the timer interrupt signal.

5. The switching controller circuit of claim 1, wherein when the pulse control signal is active, the digital PWM circuit generates the pulse wave signal with a constant pulse width and a constant frequency, and when the pulse control signal is not active, the digital PWM circuit outputs the pulse wave signal as a ground signal.

6. The switching controller circuit of claim 1, wherein the pulse wave signal generated by the PWM circuit has a pulse width and a frequency corresponding to the digital control signal.

7. The switching controller circuit of claim 1, wherein:
the processing circuit and the ADC circuit receive the clock signal when the digital clock gate enable signal and the processing clock gate enable signal are active; and
the comparator circuit, the level comparator circuit and the timer circuit receive the clock signal when the analog clock gate enable signal is active.

8. The switching controller circuit of claim 1, wherein the first control mode is an analog control mode, and the second control mode is a digital control mode.

9. The switching controller circuit of claim 2, wherein the level comparator circuit includes:
a first comparator that receives an upper-limit voltage signal and the load voltage signal, and generates a first comparison signal; and
a second comparator that receives a lower-limit voltage signal and the load voltage signal, and generates a second comparison signal.

10. The switching controller circuit of claim 9, wherein the AOI circuit includes:
a first logic gate that receives the pulse control signal, and the first comparison signal, and generates an error hold signal;
a second logic gate that receives an inverted pulse control signal and the second comparison signal, and generates a loss hold signal; and
a third logic gate, connected to the first and second logic gates for receiving the error hold signal and the loss hold signal, respectively, that outputs the pulse control signal.

11. The switching controller circuit of claim 10, wherein the first and second logic gates are AND gates, and the third logic gate is an OR gate.

12. A switching controller circuit for a power converter that is operable in at least one of first and second control modes, the switching controller comprising:
an analog control circuit that generates a pulse control signal in the first control mode, wherein the analog control circuit includes:
a peak-valley detector that generates the pulse control signal based on an analog clock gate enable signal;
a comparator circuit, connected to the peak-valley detector for receiving the pulse control signal, that generates a comparator interrupt signal based on the analog clock gate enable signal, wherein the comparator circuit includes:
a comparator that receives a load voltage signal and a reference signal, and outputs a load output under-voltage signal;
a window circuit, connected to the peak-valley detector and the comparator for receiving the pulse control signal and the load output under-voltage signal, respectively, that generates a windowed load output under-voltage signal;
a filter circuit, connected to the window circuit for receiving the windowed load output under-voltage signal, that outputs a filtered load output under-voltage signal; and
a multiplexer, connected to the window circuit and the filter circuit for receiving the windowed load output under-voltage signal and the filtered load output under-voltage signal, respectively, that outputs the comparator interrupt signal based on a filter enable signal; and
a timer circuit, connected to the peak-valley detector for receiving the pulse control signal, that generates a timer interrupt signal based on the analog clock gate enable signal, wherein the timer circuit includes:
a counter that generates a count signal based on a clock signal, the pulse control signal, and a reset signal;
a capture circuit connected to the peak-valley detector for receiving the pulse control signal and generating the reset signal; and
a compare circuit, connected to the counter that receives the count signal, that generates the timer interrupt signal based on a predetermined count value;
a digital control circuit that generates a digital control signal in the second control mode, wherein the digital control circuit includes:
an analog-to-digital converter (ADC) circuit that receives the load voltage signal and outputs a digitized load voltage signal based on a digital clock gate enable signal; and
a processing circuit connected to the ADC circuit for receiving the digitized load voltage signal, the timer circuit for receiving the timer interrupt signal, and the comparator circuit for receiving the comparator interrupt signal, wherein the processing circuit generates control mode data and the digital control signal based on a processing clock gate enable signal;
a clock enable circuit connected to the comparator circuit, the timer circuit, and the processing circuit for receiving the comparator interrupt signal, the timer interrupt signal, and the control mode data, respectively, wherein the clock enable circuit generates the analog clock gate enable signal, the digital clock gate enable signal, and the processing clock gate enable signal, wherein:
the switching controller circuit operates in the first control mode when the analog clock gate enable signal is active, and the digital clock gate enable signal and the processing clock gate enable signal are not active,
the switching controller circuit operates in the second control mode when the analog clock gate enable signal is not active, and the digital clock gate enable signal and the processing clock gate enable signal are active; and
a digital pulse width modulation (PWM) circuit connected to the analog and digital control circuits, wherein the digital PWM circuit receives: (i) the pulse control signal from the analog control circuit when the analog clock gate enable signal is active, (ii) the digital control signal from the digital control circuit when the digital clock gate enable signal is active, and (iii) outputs a pulse wave signal corresponding to one of the pulse control signal and the digital control signal.

13. The switching controller circuit of claim 12, wherein the peak-valley detector includes:
a level comparator circuit that receives the load voltage signal, the upper-limit voltage signal, the lower-limit voltage signal, the clock signal, and the analog clock gate enable signal, and outputs first and second comparison signals; and an AND-OR-Invert (AOI) circuit, connected to the level comparator circuit, that generates the pulse control signal from the first and second comparison signals.

14. The switching controller circuit of claim 12, wherein when the pulse control signal is active, the digital PWM circuit outputs the pulse wave signal having a constant pulse width and a constant frequency, and when the pulse control signal is not active, the pulse wave signal is a ground signal.

15. The switching controller circuit of claim 12, wherein the pulse wave signal generated by the digital PWM circuit has a pulse width and a frequency corresponding to the digital control signal.

16. The switching controller circuit of claim 12, wherein:
the processing circuit and the ADC circuit receive the clock signal when the digital clock gate enable signal and the processing clock gate enable signal are active; and
the comparator circuit, the level comparator circuit and the timer circuit receive the clock signal when the analog clock gate enable signal is active.

17. The switching controller circuit of claim 12, wherein the first control mode is an analog control mode, and the second control mode is a digital control mode.

18. The switching controller circuit of claim 13, wherein the level comparator circuit includes:

a first comparator that receives the upper-limit voltage signal and the load voltage signal, and generates a first control signal; and
a second comparator that receives the lower-limit voltage signal and the load voltage signal, and generates a second control signal.

19. The switching controller circuit of claim 18, wherein the AOI circuit includes:
a first logic gate that receives the pulse control signal, and is connected to the first comparator for receiving the first comparison signal, and generates an error hold signal;
a second logic gate that receives an inverted pulse control signal, and is connected to the second comparator for receiving the second comparison signal, and generates a loss hold signal; and
a third logic gate connected to the first and second logic gates for receiving the error hold signal and the loss hold signal, respectively, and generates the pulse control signal.

20. The switching controller circuit of claim 19, wherein the first and second logic gates are AND gates, and the third logic gate is an OR gate.

* * * * *